May 3, 1966  W. H. HUGGINS  3,249,860
DEVICE FOR MEASURING THE THICKNESS OF MATERIAL
Filed Nov. 1, 1961  2 Sheets-Sheet 1
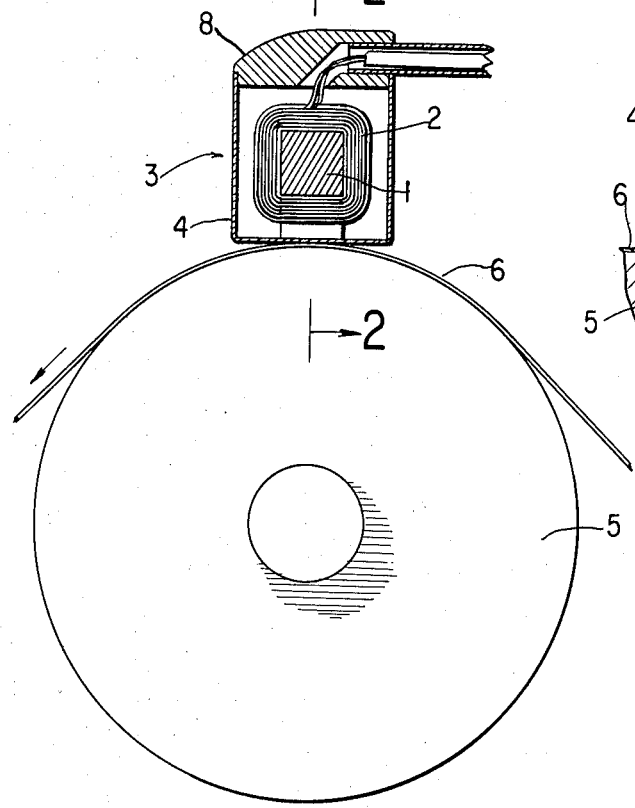
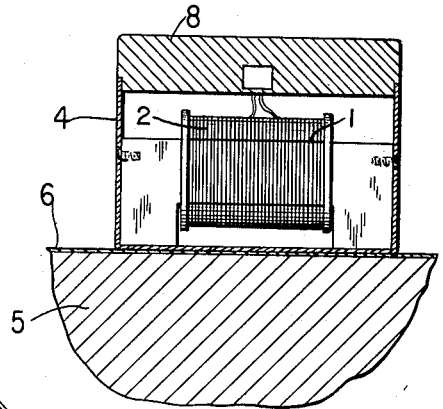
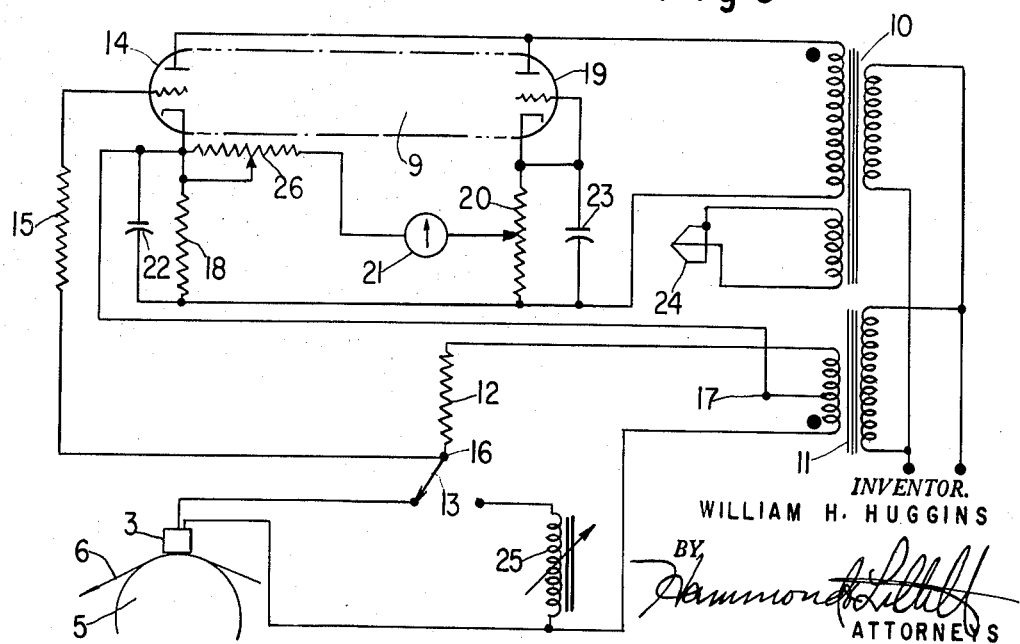
INVENTOR.
WILLIAM H. HUGGINS
BY
ATTORNEYS May 3, 1966   W. H. HUGGINS   3,249,860
DEVICE FOR MEASURING THE THICKNESS OF MATERIAL
Filed Nov. 1, 1961   2 Sheets-Sheet 2

INVENTOR
WILLIAM H. HUGGINS
BY
ATTORNEYS

United States Patent Office 3,249,860
Patented May 3, 1966

3,249,860
DEVICE FOR MEASURING THE THICKNESS OF MATERIAL
William H. Huggins, Clinton, Conn., assignor, by mesne assignments, to Central Scrap Metal Company, Inc., a corporation of Connecticut
Filed Nov. 1, 1961, Ser. No. 149,351
9 Claims. (Cl. 324—34)

This invention relates to a method and apparatus for measuring the thickness of a sheet of material. The invention more particularly relates to the measurement of the thickness of such a sheet while it is being fabricated or treated in a machine, by means of change in magnetic flux resulting in a phase change in an electronic circuit.

The use of an electromagnetic sensing device to measure thickness changes in sheet material by inductance change is known in the art. Such devices are described for example in U.S. Patents 2,503,721 and 2,537,731 to Angell; and 2,676,298, to Frommer. In the Angell patents, an electromagnetic circuit, including an electromagnetic sensing head and a Wheatstone bridge measures thickness by reactance change brought about by the increase or decrease of the distance of the sensing head from a roller which acts as an inductor, the changes being caused by differences in the thickness of the material being measured. In the Frommer device, a complex electronic circuit in combination with a number of magnetic heads was used to detect thickness by voltage changes.

Although a number of devices have been proposed for measuring the thickness of sheet material, they were either too difficult to adjust or calibrate, not sufficiently accurate or too complicated and expensive.

It is therefore an object of my invention to provide a method and apparatus for measuring thickness of sheet material with which it is possible to obtain the same sensitivity in the reading for each variation in thickness irrespective of the thickness of the material gauged.

It is a further object of my invention to provide a thickness measuring device which is simple and inexpensive in construction and maintenance.

Another object is to provide a method and apparatus for measuring thickness by using the change of magnetic flux in an inductor to bring about a phase change in a simple electronic circuit.

Yet another object is to provide a method and apparatus for measuring thickness changes wherein calibration is easily accomplished.

Still another object is to provide a method and apparatus for measuring thickness of sheet material whereby it is possible to mount the thickness gauge sensing head at a distance from the main body of the gauge.

These and other objects of my invention will become apparent as the description thereof proceeds.

I have found that the above objects may be attained and the disadvantages of the prior art overcome by the use of my invention. In my invention, I make use of any suitable magnetic sensing device in a circuit with two triode vacuum tubes in a single glass envelope which act as phase controlled rectifiers to convert alternating current to direct current.

A galvanometer is bridged between the direct current circuits made by the two triodes, one of which is connected in such a manner with the magnetic sensing head that the change in the thickness of sheet material changes magnetic flux and the phase in the triode. This brings about an unbalance between the direct current circuits which registers on the previously calibrated galvanometer bridging the circuits. Thus, changes in thickness of material being measured may be noted by the movement of the galvanometer needle.

My invention can be further understood by reference to the drawings in which

FIG. 1 is a cross-sectional side view in elevation showing the magnetic sensing head resting on the material to be measured and the reference roller.

FIG. 2 is a cross-sectional front view of the magnetic sensing head of FIG. 1.

FIG. 3 is a diagrammatic drawing of the electronic circuit used for the thickness measuring device.

Figure 4:
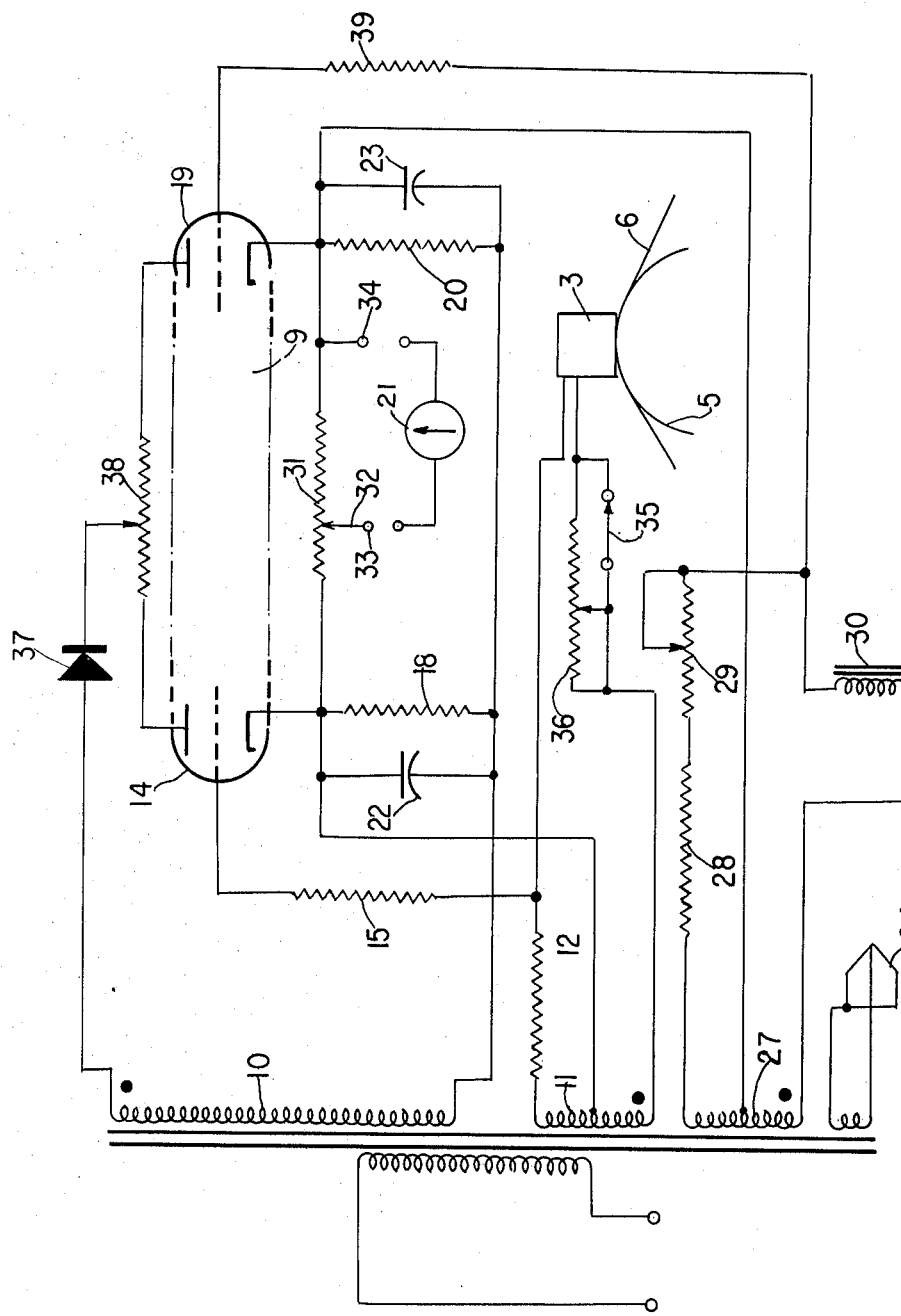
FIG. 4 is a diagrammatic drawing of a second electronic circuit used for the thickness measuring device.

The magnetic sensing head may be mounted in a number of ways. FIGS. 1 and 2 show one preferred arrangement for mounting the magnetic sensing head. A metal core 1 of suitable material, such as transformer iron, is wound with winding 2 to form a magnetic inductor 3. The magnetic inductor 3 is mounted securely against a stainless steel skid 4 approximately .020″ thick. The steel skid is provided as a means for supporting the inductor on the sheet. Stainless steel skid 4 is lowered against a sheet of material 6, which passes over a suitable reference plate, for example roll 5, constructed from a ferrous material such as steel or iron. As it may be seen in this arrangement, roll 5 acts as a shunt or armature to complete the magnetic field of inductor 3. Roll 5 also serves as a surface over which sheet 6 passes. Roll 5 could be replaced by any other suitable structure, such as a flat surface. The thickness of the material 6, passing between the stainless steel skid 4 and the roll 5, acts as a variable flux gap since any change in the thickness of sheet 6 will change the distance between inductor 3 and roll 5. Thus, the lines of flux through this gap will vary, and consequently the reactance of the inductor 3 will vary as the thickness of the material 6 varies. A cover 8 is provided for the sensing head and the lead wires of winding 2 lead out through cover 8 to an electromagnetic circuit which is described in detail in subsequent paragraphs.

Although I have described a magnetic sensing head having a specific structure, it will be understood that any suitable magnetic sensing head can be used.

In FIG. 3, the circuitry of the gauge includes two main circuits, one including a vacuum tube bridge circuit having a twin triode tube 9 (such as a 12AT7 or 12AU7 tube, for example), receiving current through transformer 10 and a phase shift circuit connected to one side of the bridge and including the sensing head 3 described above. The phase shift circuit receives current through transformer 11. Both transformers 10 and 11 are connected in parallel across the lines of a 115 volt, 60 cycle source of alternating current. Transformers 10 and 11 are out of phase.

Considering the bridge circuit in further detail, triode 14, resistance 18, triode 19 and resistance 20 form a bridge circuit with meter 21 serving as a balance or null indicator. As previously explained, triodes 14 and 19 may be in a common envelope such as a tube of the type 12AT7 or 12AU7. Triode 14 functions as a phase controlled rectifier, developing a D.C. voltage across resistance 18, the amplitude of which is determined by the phase angle of the voltage applied to the grid of triode 14. Capacitors 22 and 23 are provided as part of the bridge circuit. Resistance 20 is a potentiometer and is the adjustable means provided to balance the bridge circuit as indicated by 0 reading on galvanometer 21. 24 is the filament for triodes 14 and 19.

In FIG. 3, inductor 3 of the sensing head, described above, is connected, in series with resistance 12 and transformer 11 to form a phase shift network. The operation of switch 13 will be explained in further detail subsequently. The phase shift network is further connected to the grid of triode 14 through resistance 15, and from the center tap 17 of transformer 11 to the cathode of triode 14. Any change in the thickness of sheet 6 varies the air gap between inductor 3 and roll 5, thus changing the magnetic flux and the reactance in inductor 3 which changes the phase of the voltage applied to the grid of triode 14. The amplitude of the output voltage at points 16 and 17 of the phase shift network remains essentially constant.

The inductive sensing head 3, as used with this gauge, may be mounted remotely any convenient distance away from the main body of the gauge which contains the electronic circuits.

The gauge circuit of FIG. 3 may be operated in the following manner:

When the sheet of material 6 passing over a metal roll 5 is to be gauged, the sensing head 3 is lowered on sheet 6. This will unbalance the triode 14, resistance 18 section of the bridge. Potentiometer 20 should be adjusted so that galvanometer 21 will read "0," indicating the bridge is balanced. The 0 or null point of meter 21 is now directly related to the thickness of the material 6. A change in the thickness of sheet 6 changes the magnetic flux and reactance in inductor 3 and thus the phase of the grid voltage to triode 14, changing the amplitude of the voltage across resistance 18. This results in movement of the needle in meter 21. Any increase in thickness in the material being gauged will result in a positive deflection of meter 21. Any decrease in the thickness of the material will result in a negative deflection of meter 21.

At this point I have shown how to gauge the thickness of a material, but a means for calibration and the determination of deviation must be provided.

This may be done in the following manner: A standard of thickness may be placed between the sensing head 3 and the roll 5. The bridge is balanced by means of potentiometer 20. The meter 21 will read "0." The standard of thickness is removed and the sheet to be gauged is passed between the sensing head 3 and the roll 5. The meter 21 will read "0" when the thickness of the material is equal to the standard of thickness. Also, if the meter 21 has a positive indication, the material is thicker than the standard of thickness, and vice versa.

I have now shown one method for calibrating the gauge; that is, a reference standard has been supplied. However, should it be desired to change the thickness of the material being measured a new standard of thickness must be applied under the sensing head. With a sheet of material in motion, this would be impractical.

In my invention, I prefer to use the following method which provides a reliable, practical arrangement.

By means of switch 13 an adjustable inductor 25 is substituted for sensing inductor 3 in the phase shift network. Inductor 25 is an adjustable pre-calibrated inductor which can be calibrated in terms of thickness. When inductor 25 is set to the level of thickness it is desired to gauge, it will place on the grid of triode 14 a phase shift voltage exactly equal to that which inductor 3 would provide were it riding on a standard of thickness as in the previous methods of adjustment described above.

To provide a method for determining deviation from the calibrated settings, a variable resistance 26 is placed in series with meter 21. In essence this is a sensitivity control. For example, if it is desired to gauge a sheet having a thickness of .005" with a deviation of plus or minus .001", the gauge would be set in the following manner:

Adjustable inductor 25 is set to read .005". Resistance 26 is turned to maximum resistance (minimum sensitivity). By means of switch 13, inductor 25 is switched into the phase shift circuit. Potentiometer 20 is then adjusted to a 0 reading on meter 21. This calibrates the gauge to .005". Inductor 25 is then set to a reading of .006", and potentiometer 26 is turned until the desired amount of plus deviation is read on meter 21. Deviation in this gauge need only be adjusted in one direction, as the response of the gauge is linear through small changes in thickness. To check this, inductor 25 may be adjusted to .004" and the meter will give a minus deviation equal to the plus deviation for .006". Inductor 25 is then reset to .005". After calibration, switch 13 is then switched in such a manner as to put the sensing head inductor 3 in the phase shift network. The phase shift determined by inductor 3 on a .005" sheet would be the same as the adjusted setting of inductor 25 for .005" and would produce a corresponding reading on meter 21.

My invention may also be used to calibrate any sheet of unknown thickness. For example, if inductor 3 is running on a sheet of unknown thickness, the gauge may be adjusted to calibrate the material in the following manner:

Potentiometer 20 is adjusted until meter 21 reads "0." Then inductor 25 is substituted for inductor 3 by operating switch 13. Inductor 25 is then adjusted until meter 21 again reads "0." The thickness of the unknown material is then shown directly on the dial of inductor 25. The reliability and ease of operation of this gauge has been shown above.

As pointed out previously, triode 14, resistance 18, triode 19 and resistance 20 form a bridge. Triodes 14 and 19 are in a common envelope with a common filament. This is done to prevent errors in the readings of meter 21 due to line voltage changes.

FIG. 4 shows another embodiment of my invention wherein a modified circuit is used. In the thickness gauge the modified circuit is basically similar to that of FIG. 3, with a few minor variations consisting mainly of two phase shift circuits connected to the opposite sides of the bridge. The modifications provide greater ease of calibration in production and operation, and enhance circuit stability.

In the circuit of FIG. 4, triodes 14 and 19 with resistances 18 and 20 form a bridge circuit. Triode 14 functions as a phase controlled rectifier developing a D.C. voltage across resistance 18, the amplitude of which is determined by the phase of the voltage applied to the grid of triode 14. Triode 19 also functions as a phase controlled rectifier developing a D.C. voltage across resistance 20, the amplitude of which is determined by the phase of the voltage applied to the grid of triode 19. Capacitors 22 and 23 are provided to integrate or smooth the voltage developed on resistances 18 and 20. Transformer winding 11 (which is out of phase with transformer winding 10), resistor 12 and the inductor 3 (sensing head) form a phase shift circuit which controls triode 14. Transformer winding 27 (which is out of phase with transformer winding 10) resistances 28 and 29 and inductor 30 form a phase shift circuit which controls triode 19.

The phase shift circuit controlling triode 19 includes a resistance 29. In operation, resistance 29, which is accurately calibrated, serves two functions. First, it provides a predetermined reference calibration. Secondly, it automatically balances the bridge, thus simplifying overall instrument operation. Resistance 31 is a potentiometer across which the bridge output voltage is developed. Adjustment 32 on resistance 31 is the output deviation control. 33 and 34 are the output terminals. Across these terminals may be connected any suitable type "0" center meter of either a D'Arsonval movement, or a V.T.V.M., or if any more gain is desired, any suitable type null amplifier that may be within the knowledge of the art.

When inductor 3 in the phase shift circuit controlling triode 14 is displaced from roll 5 by a nonferrous material of for example, .005 inch, a voltage will be developed across resistance 18. Resistance 29 may then be adjusted until a voltage is developed across resistance 20, which is equal to the voltage across resistance 18, and there is no voltage differential across resistance 31, and a null point has been reached. From this explanation it may readily be seen that resistance 29 may be pre-calibrated for various thicknesses of material 6 that may be passed between inductor 3 and roll 5.

Deviation settings for the indicating meter 21 of the instrument are performed in the following manner: After resistance 29 has been set to the initial calibration point (which produces a null on meter 21) the inductor 3 is lifted (by suitable means) from the roll. Switch 35 is opened. Then resistance 36 in the sensing phase shift circuit is set to again "null" meter 21. Resistance 29 is then set to a reading of .001 inch higher than its previous null point. Slider 32 on resistance 31 is then set to give the deviation desired on meter 21 for a .001 inch change. Resistance 29 is then set back to its first null setting. Switch 35 is closed and inductor 3 is returned to engage material 6 traveling over roll 5.

The use of resistance 36 and switch 35 provides for an infinite combination of deviation settings. In certain instances it is desirable to have fixed deviation settings which can be accomplished by removing resistance 36 and switch 35 and providing calibration on resistance 31 for fixed deviation settings, while using resistance 29 in the same manner described above. Such an arrangement provides a simpler circuit and easier calibration and operation.

Diode 37 is provided as a means to eliminate high peak inverse voltage across triodes 14 and 19. Resistance 38 is provided as a means of balancing the currents in triodes 14 and 19. Resistances 15 and 39 are provided to minimize grid currents in triodes 14 and 19.

Thus, it will be seen from the above description that my gauge may be for continuously measuring the thickness of sheet material as it is manufactured. The gauge can also be used to correct for errors of thickness in the material as manufactured. In this case, a relay circuit may be connected in a manner known in the art to the bridge circuit in such a way that the change in phase brought about by sensing head 3 is also used to put into operation suitable mechanical means to alter the manufacturing process and bring the thickness of the sheet material back to the desired thickness.

While I have described some specific embodiments and preferred modes of practice of my invention, this is solely for the purpose of illustration and to enable persons skilled in the art to better understand and practice the invention. The invention may be constructed from components well known in the art. There is no intention to limit the invention to the specific embodiments of the preceding description, and various changes and modifications may be made therein without departing from the spirit of the disclosure or the scope of the appended claims.

I claim:

1. In combination, an electric circuit which comprises, a source of continuous alternating current, a pair of rectifying means to rectify said alternating current to a continuous direct current, means to balance the currents in said rectifying means, a first biasing means to bias one of said rectifying means with a reference voltage of constant amplitude and phase angle, a second biasing means to bias the other rectifier with a voltage of constant amplitude and variable phase angle, means to feed a biasing current of variable phase angle into said second biasing means and means to measure the amplitude of the direct current voltage across said pair of rectifying means as a function of the relative phase displacement of said biasing voltages.

2. A device for measuring the thickness of dielectric materials which comprises, a source of continuous alternating current, a pair of rectifying means of the control type to rectify said alternating current to a continuous direct current, a first biasing means to bias one of said rectifying means with a reference voltage of constant amplitude and phase angle, a second biasing means having a sensing means responsive to changes in thickness in a dielectric material to bias the other rectifier with a voltage of constant amplitude and variable phase angle, and means to measure the amplitude of the direct current voltage across said pair of rectifying means as a function of the relative phase displacement of said biasing voltages.

3. A device for measuring the thickness of dielectric materials which comprises, a source of continuous alternating current, a pair of rectifying means of the control type to rectify said alternating current to a continuous direct current, a first biasing means to bias one of said rectifying means with a reference voltage of constant amplitude and phase angle, a second biasing means to bias the other rectifier with a voltage of constant amplitude and variable phase angle, including means for varying said phase angle in accordance with the thickness of a dielectric material, and means to measure the amplitude of the direct current voltage across said rectifying means as a function of the relative phase displacement of said biasing voltages.

4. A device for measuring the thickness of dielectric materials which comprises, a source of continuous alternating current, a pair of rectifying means of the control type to rectify said alternating current to a continuous direct current, a first biasing means to bias one of said rectifying means with a reference voltage of constant amplitude and phase angle, including means to balance the currents in said rectifying means, a second biasing means to bias the other rectifier with a voltage of constant amplitude and variable phase angle, a register means to measure the amplitude of the direct current voltage across said rectifying means as a function of the relative phase displacement of said biasing voltages, means to adjust the sensitivity of said register means, and means in said second biasing circuit to calibrate said register means for a standard of thickness.

5. A device for measuring the thickness of dielectric materials which comprises, a source of continuous alternating current, a pair of rectifying means of the control type to rectify said alternating current to a continuous direct current, a first biasing means to bias one of said rectifying means with a reference voltage of constant amplitude and phase angle, a second biasing means to bias the other rectifier with a voltage of constant amplitude and variable phase angle, including electromagnetic sensing means responsive to the changes in thickness in a dielectric material to vary the phase angle of said voltage, and means to measure the amplitude of the direct current voltage across said pair of rectifying means as a function of the relative phase displacement of said biasing voltages.

6. A device for measuring the thickness of dielectric materials which comprises, a source of continuous alternating current, a pair of rectifying means of the control type to rectify said alternating current to a continuous direct current, means to balance the alternating current to said rectifiers, a first biasing means to bias one of said rectifying means with a reference voltage of constant amplitude and phase angle, a second biasing means having a sensing means responsive to changes in thickness in a dielectric material to bias the other rectifier with a voltage of constant amplitude and variable phase angle, said biasing voltage amplitudes being substantially equal, and means to measure the amplitude of the direct current voltage across said rectifying means as a function of the relative phase displacement of said biasing voltages.

7. A device for measuring the thickness of dielectric materials which comprises, a source of continuous alternating current, a pair of rectifying means of the control type to rectify said alternating current to a continuous direct current, means to balance the alternating current to said rectifiers, a first biasing means to bias one of said rectifying means with a reference voltage of constant amplitude and phase angle, a second biasing means having a sensing means responsive to changes in thickness in a dielectric material to bias the other rectifier with a voltage of constant amplitude and variable phase angle, said biasing voltage amplitudes being substantially equal, and means to measure the amplitude of the direct current voltage across said rectifying means as a function of the relative phase displacement of said biasing voltages, wherein said alternating and biasing voltages are obtained from a common means through transformer coupling from a common primary, the couplings for each said biasing voltage being out of phase with the coupling for said alternating voltage.

8. A device for measuring the thickness of dielectric materials which comprises, a source of continuous alternating current, a pair of triodes having anodes, grids and cathodes to rectify said alternating current to a continuous direct current, a first biasing means to bias one of said rectifying means with a reference voltage of constant amplitude and phase angle, a second biasing means to bias the other rectifier with a voltage of constant amplitude and variable phase angle including means to vary said phase angle responsive to the thickness of a dielectric material, and means to measure the amplitude of the direct current voltage across the cathodes of said triodes as a function of the relative phase displacement of said biasing voltages.

9. A device for measuring the thickness of dielectric materials which comprises, a source of continuous alternating current, a pair of triodes, each having an anode, a grid and a cathode to rectify said alternating current to a continuous direct current, said alternating current being connected to said anodes, resistor capacitor means for each triode to produce a substantially steady current therefrom, resistive means bridging the currents from said triodes, a first reference biasing voltage of constant amplitude and phase angle connected to the grid of one of said triodes, a second biasing voltage of constant amplitude and variable phase angle connected to the grid of other of said triodes including means for varying said phase angle responsive to changes in thickness in a dielectric material, and register means across said bridging resistor to measure the amplitude of the direct current voltage across said triodes as a function of the relative phase displacement of said biasing voltages.

References Cited by the Examiner

UNITED STATES PATENTS

| | | | |
|---|---|---|---|
| 2,221,517 | 11/1940 | Holters | 328—133 X |
| 2,429,636 | 10/1947 | McCoy | 328—134 |
| 2,527,096 | 10/1950 | Howes | 324—89 |
| 2,764,734 | 9/1956 | Yates | 324—40 |
| 2,820,143 | 1/1958 | D'Nelly et al. | 328—134 |

RICHARD B. WILKINSON, *Primary Examiner.*

WALTER L. CARLSON, *Examiner.*

F. A. SEEMAR, *Assistant Examiner.*